(12) United States Patent
Feng et al.

(10) Patent No.: US 12,365,206 B2
(45) Date of Patent: Jul. 22, 2025

(54) TPMS TRANSMITTER FIXING STRUCTURE AND ASSEMBLING STRUCTURE

(71) Applicant: BAOLONG HUF SHANGHAI ELECTRONIC CO., LTD., Shanghai (CN)

(72) Inventors: Meilai Feng, Shanghai (CN); Wei Li, Shanghai (CN); Weihua Shi, Shanghai (CN); Zhenfang Qiu, Shanghai (CN); Changwu Xu, Shanghai (CN); Zuofei Tong, Shanghai (CN); Dongdeng Hong, Shanghai (CN); Tinghua Yang, Shanghai (CN)

(73) Assignee: BAOLONG HUF SHANGHAI ELECTRONIC CO., LTD., Shanghai (CN)

( * ) Notice: Subject to any disclaimer, the term of this patent is extended or adjusted under 35 U.S.C. 154(b) by 993 days.

(21) Appl. No.: 17/181,771

(22) Filed: Feb. 22, 2021

(65) Prior Publication Data

US 2021/0276376 A1    Sep. 9, 2021

Related U.S. Application Data

(63) Continuation of application No. PCT/CN2019/088997, filed on May 29, 2019.

(30) Foreign Application Priority Data

Aug. 20, 2018  (CN) .......................... 201810949819.0

(51) Int. Cl.
*B60C 23/04* (2006.01)
*B60C 29/02* (2006.01)
*H04B 1/03* (2006.01)

(52) U.S. Cl.
CPC .......... *B60C 23/0494* (2013.01); *B60C 29/02* (2013.01); *H04B 1/03* (2013.01)

(58) Field of Classification Search
CPC ........ B60C 23/0494; B60C 29/02; H04B 1/03
See application file for complete search history.

(56) References Cited

U.S. PATENT DOCUMENTS 6,945,104 B2 *   9/2005   Uleski ................. B60C 23/0408
                                                73/146.8
6,952,955 B1    10/2005   Uleski
(Continued)

FOREIGN PATENT DOCUMENTS

CN    202038125 U    11/2011
CN    202062964 U    12/2011
(Continued)

OTHER PUBLICATIONS

International Search Report issued for International Patent Application No. PCT/CN2019/088997, Date of mailing: Jul. 18, 2019, 8 pages including English translation.
(Continued)

*Primary Examiner* — Jill E Culler
(74) *Attorney, Agent, or Firm* — HSML P.C.

(57) ABSTRACT

A TPMS transmitter (100) fixing structure, comprising a valve stem and a core rod (200) in the middle of the valve stem, the core rod (200) having a connector suitable for connecting to the TPMS transmitter (100), and also comprising a protruding part protruding outward along the radial direction of the valve stem, such that, when the valve stem is mounted on a wheel rim (300) of an automobile, the protruding part is in contact with the wheel rim (300); adding a protruding part to the valve stem can counteract the rotational torque produced by the eccentricity and centrifugal force of the transmitter to forcefully prevent rotation of the transmitter during operation, and limits the mounting (Continued)

direction of the TPMS transmitter, ensuring that the TPMS transmitter is not biased when mounted on the wheel rim, and effectively reducing the risk of the loss of function or reduction in performance of the TPMS transmitter due to biased or backward mounting of the TPMS transmitter.

8 Claims, 11 Drawing Sheets

(56) References Cited

U.S. PATENT DOCUMENTS

| | | | |
|---|---|---|---|
| 7,568,386 B2* | 8/2009 | Blossfeld | B60C 23/0408 73/146.8 |
| 8,511,332 B2 | 8/2013 | Robert | |
| 10,792,961 B2* | 10/2020 | Sugino | B60C 29/02 |
| 2004/0163456 A1* | 8/2004 | Saheki | B60C 23/0408 73/146.8 |
| 2008/0289406 A1 | 11/2008 | Benatti et al. | |
| 2009/0115239 A1 | 5/2009 | Palaoro | |
| 2012/0017672 A1 | 1/2012 | Uh et al. | |
| 2012/0103432 A1 | 5/2012 | Robert | |
| 2015/0210126 A1 | 7/2015 | Arnoldo et al. | |
| 2018/0038500 A1 | 2/2018 | Mori | |

FOREIGN PATENT DOCUMENTS

| | | |
|---|---|---|
| CN | 203472436 U | 3/2014 |
| CN | 104853940 | 8/2015 |
| CN | 105090572 A | 11/2015 |
| CN | 205800674 U | 12/2016 |
| CN | 108025605 | 5/2018 |
| CN | 210082841 U | 2/2020 |
| DE | 10047853 A1 | 2/2002 |
| EP | 0958947 A2 | 11/1999 |
| EP | 1340630 A1 | 9/2003 |
| EP | 1911610 A1 | 4/2008 |
| FR | 2947214 A1 | 12/2010 |
| JP | H09222176 A | 8/1997 |
| JP | 2014073843 A | 4/2014 |
| WO | 2010114187 | 10/2010 |
| WO | 2017032504 | 3/2017 |

OTHER PUBLICATIONS

Office Action issued for Canadian Patent Application No. 3,109,996, dated Aug. 12, 2022, 5 pages.
Communication pursuant to Article 94(3) EPC, issued for European Patent Application No. 19851524.9, dated Oct. 24, 2023, 6 pages.
Extended European Search Report issued for European Patent Application No. 19851524.9, dated Apr. 8, 2022, 10 pages.
Office Action issued for Chinese Patent Application No. 201910409638.3, dated Apr. 1, 2024, 9 pages.

* cited by examiner

TPMS TRANSMITTER FIXING STRUCTURE AND ASSEMBLING STRUCTURE

TECHNICAL FIELD

The invention mainly relates to a tire pressure monitor system (TPMS), in particular to a fixing structure and an assembling structure of a transmitter in a TPMS system.

BACKGROUND ART

TPMS system is a real-time monitoring system for tire pressure through tire pressure sensing unit and tire pressure monitoring unit using radio frequency communication.

In order to realize real-time monitoring, the system is equipped with a TPMS transmitter on each tire, which can monitor the pressure and temperature in the tire and send it to the TPMS receiver in the automobile. In order to realize a fixed mounting of the TPMS transmitter and not to fall off under various harsh vehicle conditions, one mounting method is to mount the TPMS transmitter on the wheel rim of the tire and fix it together with the valve stem. In this case, although the TPMS transmitter will still be loose while the automobile is driving, it will not significantly affect its performance.

However, with the continuous improvement of TPMS transmitter, the requirements of its position or attitude also increase. For example, when the TPMS transmitter has positioning function, it is expected that the TPMS transmitter will always be in an appropriate attitude without rotation relative to the wheel rim. In particular, the miniaturization of TPMS transmitter makes it more difficult to be relatively fixed with the wheel rim, which aggravates the possibility of rotation. In addition, there are strict requirements for the mounting location of the TPMS transmitter, which makes the mounting more complicated.

SUMMARY OF THE INVENTION

The problem to be solved by the present invention is to provide a TPMS transmitter fixing structure, which can prevent the rotation of the TPMS transmitter.

One aspect of the present invention provides a TPMS transmitter fixing structure, comprises a valve stem, the valve stem includes a core rod, the core rod has a connector suitable for connecting to the TPMS transmitter, wherein the valve stem also includes a protruding part protruding outward along the radial direction of the valve stem, and when the valve stem is mounted on a wheel rim of an automobile, the protruding part is in contact with the wheel rim.

Optionally, the protruding part causes the radial outer contour of the valve stem to be a non-rotating curved surface.

Optionally, the protruding part is formed on an elastomer covering the core rod.

Optionally, the protruding part comprises a supporting part suitable for supporting on a wheel rim surface of the wheel rim.

Optionally, a middle part of a contact surface between the supporting part and the wheel rim surface has a depression radially inward along the valve stem.

Optionally, the protruding part comprises a supporting member fixed on the core rod and suitable for supporting on a wheel rim surface of the wheel rim.

Optionally, the supporting member comprises at least two supporting feet.

Optionally, the supporting member is rigid.

Optionally, the protruding part is located at a position suitable for contacting with a sidewall of the wheel rim in an axial direction of the valve stem, wherein the sidewall of the wheel rim has a concave part matched with the protruding part.

Another aspect of the present invention provides a TPMS transmitter assembling structure, comprising: the fixing structure as above; and a transmitter, which is assembled with the fixing structure, wherein a center of gravity of the fixing structure and the transmitter as a whole is arranged at a part of the valve stem located outside the wheel rim.

Another aspect of the present invention provides a TPMS transmitter fixing structure, comprises a wheel rim, the wheel rim has a wheel rim hole for mounting a valve stem, wherein a wheel rim surface of the wheel rim is provided with a protruding part on both sides of the wheel rim hole in the radial direction of the wheel rim, when the TPMS transmitter is mounted on the wheel rim, two of the protruding parts contact the two sides of the TPMS transmitter respectively.

Optionally, the side of each protruding part facing the wheel rim hole has a stop block for blocking the side edge of the TPMS transmitter.

Optionally, the side of each protruding part facing the wheel rim hole has a groove for restricting the side edge of the TPMS transmitter.

Compared with the prior art, the present invention has the following advantages:
1. A protruding part is added on the valve stem, which can counteract the rotational torque produced by the eccentricity and centrifugal force of the transmitter, and effectively prevent rotation of the transmitter during operation;
2. The protruding part added on the valve stem limits the mounting direction of the TPMS transmitter, which can ensure that the TPMS transmitter will not be biased when it is mounted on the wheel rim, and can effectively reduce the risk of loss of function or reduction in performance of the TPMS transmitter due to biased or backward mounting of the TPMS transmitter;
3. By making the overall center of gravity of the transmitter and the fixing structure at the outside of the wheel rim, the transmitter can be prevented from being lifted off the wheel rim surface by centrifugal force.

BRIEF DESCRIPTION OF THE DRAWINGS

The features and performance of the present invention are further described by the following embodiments and the attached drawings.

DETAILED DESCRIPTION OF PREFERRED EMBODIMENTS

In order to make the above objects, features and advantages of the present invention more obvious and easy to understand, the specific embodiment of the present invention are described in detail in combination with the drawings.

In the following description, many specific details are described to facilitate a full understanding of the invention, but the invention can be implemented in other ways different from those described here, so the present invention is not limited by the specific embodiments disclosed below.

When detailing the embodiments of the present application, for convenience of explanation, the sectional view showing the device structure will not be partially enlarged according to the general scale, and the schematic diagram is only an example, which shall not limit the scope of protection of the present application. In addition, the actual production should include the length, width and depth of the three-dimensional space size.

As shown in the present application and the claims, unless the context specifically indicates an exception, the words "one", "one kind" and/or "the" do not specifically refer to the singular, but may also include the plural. Generally speaking, the terms "include" and "contain" only indicate the steps and elements that have been clearly identified. These steps and elements do not constitute an exclusive list. Methods or devices may also include other steps or elements.

When detailing the embodiments of the present application, for convenience of explanation, the sectional view showing the device structure will not be partially enlarged according to the general scale, and the schematic diagram is only an example, which shall not limit the scope of protection of the present application. In addition, the actual production should include the length, width and depth of the three-dimensional space size.

For convenience of description, it is possible here to use spatial relation words such as "under", "below", "lower", "underneath", "above", "up" and so on to describe the relationship between one element or feature shown in the drawings and other elements or features. It will be understood that these spatial relationship terms are intended to include directions of devices in use or operation other than those depicted in the drawings. For example, if the device in the figure is flipped, the direction of the element described as "below" or "under" or "underneath" of other element or feature will be changed to "above" of the other element or feature. Thus, the exemplary words "below" and "underneath" can contain both up and down directions. The device may also have other orientations (rotated 90 degrees or in other directions), so the spatial relationship descriptors used here should be interpreted accordingly. In addition, it will be understood that when a layer is referred to as "between" two layers, it can be the only layer between the two layers, or there can be one or more layers in between.

In the context of the present application, the described structure of the first feature "above" the second feature may include an embodiment in which the first and second features are formed into direct contact, or an embodiment in which another feature is formed between the first and second features, so that the first and second features may not be in direct contact.

Figure 1:
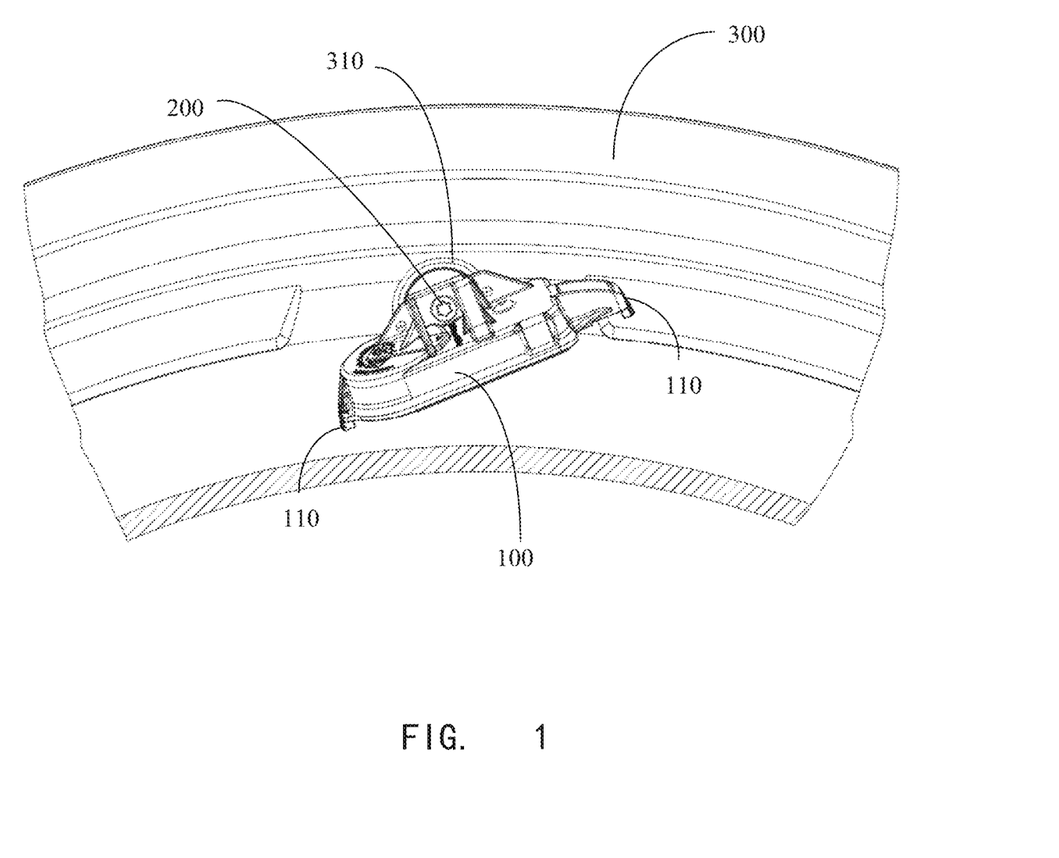
FIG. 1 is a schematic diagram of a TPMS transmitter mounted on a conventional valve stem rotating during driving of an automobile.

As shown in FIG. 1, a TPMS transmitter 100 is usually fixed on the end of a core rod 200 of a valve stem located inside of the wheel rim 300. During driving, due to acceleration, deceleration, bumping, turning and other complex conditions, the center of gravity position of the TPMS transmitter 100 is constantly changing. Under the action of centrifugal force, the TPMS transmitter 100 is lifted away from the wheel rim 300. Common valve stems are cylindrical in design. When the automobile is driving, the valve stem will rotate around the core rod 200 in the wheel rim hole 310. At this time, the TPMS transmitter 100, fixed to the core rod 200, rotates with the valve stem. After rotation, the center of gravity of the TPMS transmitter 100 deviates further from the center plane of valve stem, resulting in the increase of rotational torque and rapid increase of rotational angle. Due to the rotation, the TPMS transmitter 100 deviates from the normal position, which affects the strength of its transmitted signal in a specific direction, resulting in the TPMS receiver in the automobile cannot receive a normal and effective signal.

The TPMS transmitter 100 in FIG. 1 is provided with two legs 110 at the bottom contacting the wheel rim 300. However, when the TPMS transmitter 100 is lifted away from the wheel rim 300, the legs 110 lose their supporting function and can no longer prevent the TPMS transmitter 100 from rotating.

An embodiment of the present invention sets a fixing structure on the valve stem of TPMS transmitter 100, including a protruding part protruding outward along the radial direction of the valve stem. When the valve stem is mounted on the wheel rim 300 of the automobile, the protruding part is in contact with the wheel rim 300, thus preventing the rotation of the valve stem, and further preventing the TPMS transmitter 100 mounted on the core rod 200 from rotating with the valve stem.

Furthermore, since the purpose of setting the protruding part is to prevent the rotation of the valve stem, the protruding part causes the radial outer contour of the valve stem to be a non-rotating curved surface, so that it will not rotate even under the action of external force during the driving of the automobile. The protruding part of the valve stem of the present invention has but is not limited to the following embodiments.

Embodiment 1

Figure 2A:
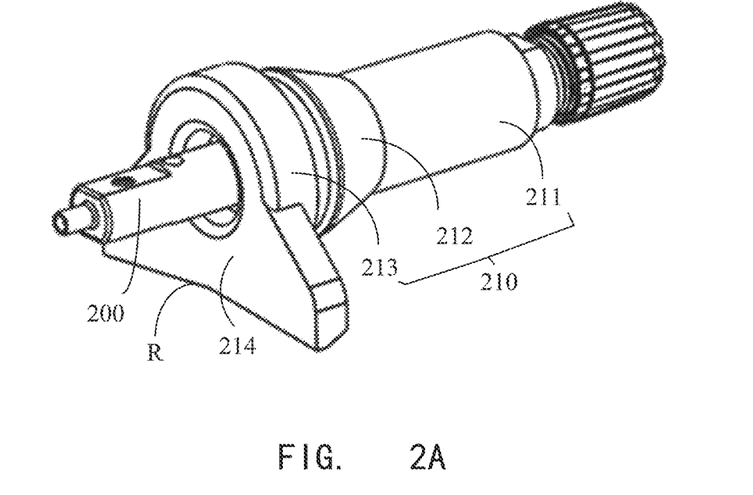
FIG. 2A is a schematic diagram of the first embodiment of the present invention, the protruding part of the valve stem is a supporting part added at the elastomer end section of the valve stem.

As shown in FIG. 2A, the core rod 200 is a rigid body, such as metal. The core rod 200 is covered with an elastomer 210, which can be divided into an elastomer mouth 211 near the valve stem filling hole, an elastomer middle section 212 and an elastomer end section 213 near the wheel rim hole 310. In the protruding part of the valve stem of this embodiment, a supporting part 214 is added on the elastomer end section 213, and the supporting part 214 can be integrally formed or fixedly connected with the elastomer 210. The material of the supporting part 214 can be the same as that of the elastomer 210, so as to facilitate one-time molding or fixed connection, and it can also be other elastic materials.

The elastomer end section 213 of the valve stem can be a hollow cylinder, and the height of the cylinder is the thickness of the elastomer end section 213 along the valve stem axis (hereinafter referred to as thickness). The thickness of the supporting part 214 is less than or equal to the thickness of the elastomer end section 213. The middle part of the contact surface between the supporting part 214 and the wheel rim 300 has a depression R inward along the radial direction of the valve stem, so that the supporting part 214 has two supporting feet. Of course, the middle part of the contact surface between the supporting part 214 and the wheel rim 300 can also fully fit with the supporting part 214 without the depression R.

Figure 2B:
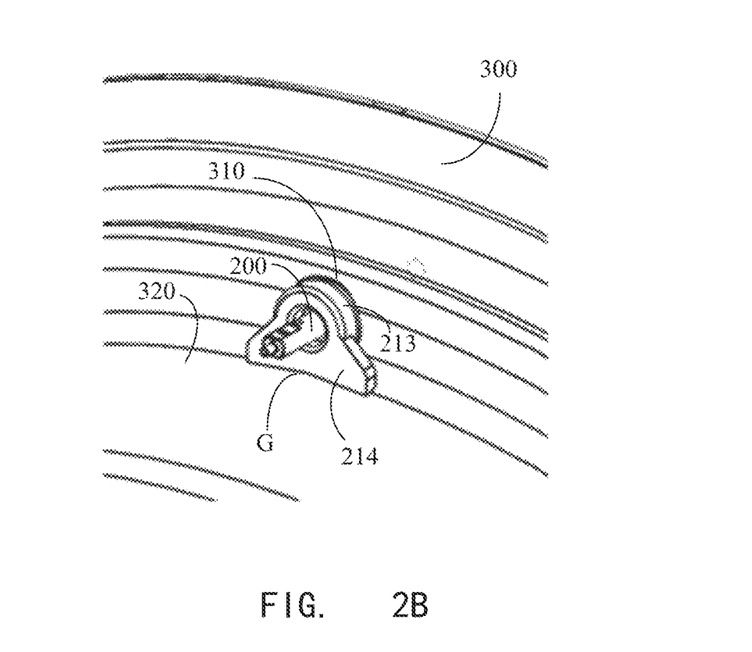
FIG. 2B is a schematic diagram of the first embodiment of the present invention when it is mounted on a wheel rim hole.

FIG. 2B is a schematic diagram when this embodiment is mounted on a wheel rim hole 310. When the valve stem is mounted on the wheel rim hole 310, the elastomer 210 passes through the wheel rim hole 310 and contacts with the wheel rim surface 320 to play the role of sealing and buffering. The core rod 200 is inserted into the wheel rim hole 310, the elastomer end section 213 of the elastomer and the supporting part 214 are both located in the inner plane of the wheel rim hole 310, and the supporting part 214 is supported on the wheel rim surface 320 in the wheel rim 300, so that the valve stem will not rotate during the driving of the automobile. When the valve stem is mounted on the wheel rim hole 310, there is a gap G between the supporting part 214 and the wheel rim surface 320, which plays a certain buffer role of the supporting part 214 during the driving of the automobile.

Figure 2C:
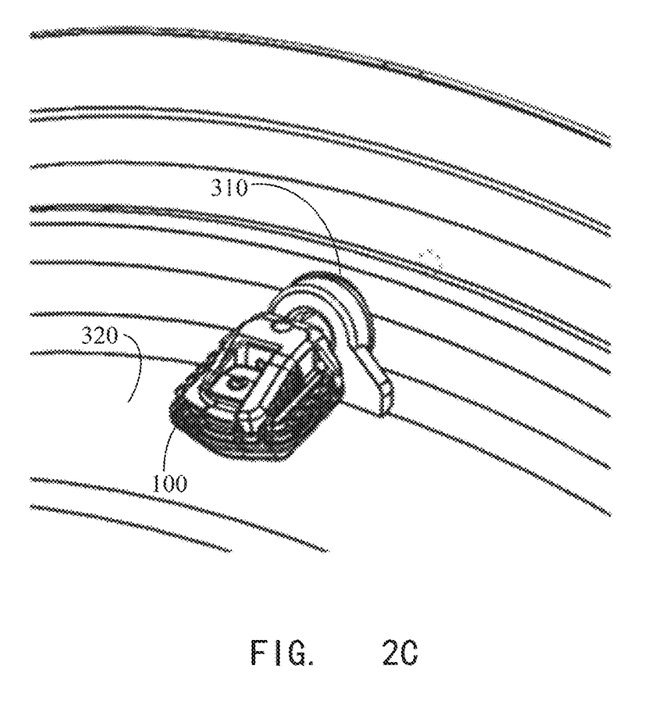
FIG. 2C is a schematic diagram when the first embodiment of the present invention and a TPMS transmitter are mounted on the wheel rim hole together.
Figure 2D:
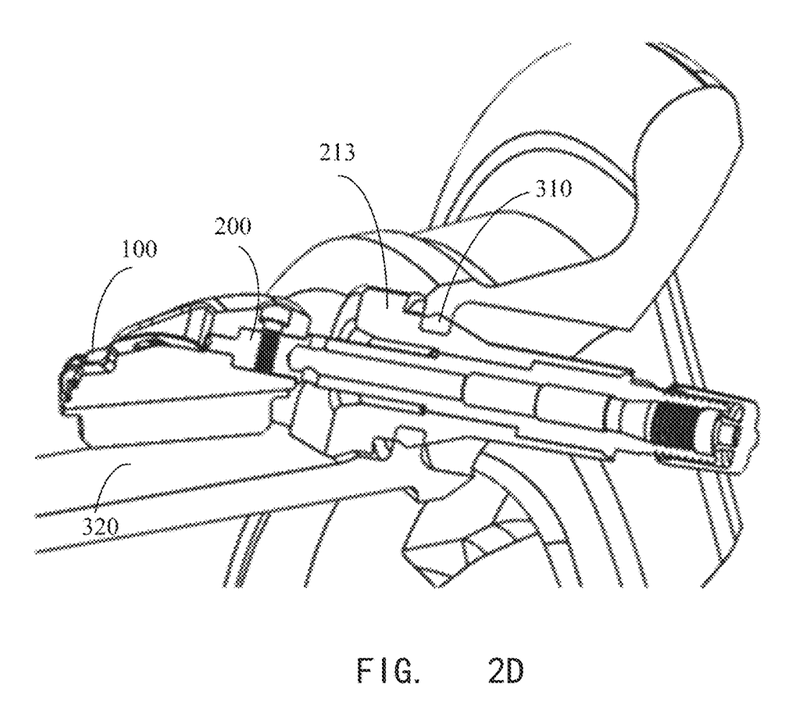
FIG. 2D is a cross-sectional view of the first embodiment of the present invention and a TPMS transmitter mounted on the wheel rim hole together.

FIG. 2C is a schematic diagram when the valve stem of the present embodiment and a TPMS transmitter 100 are mounted on the wheel rim hole 310 together. FIG. 2D is a cross-sectional view when the valve stem of the present embodiment and a TPMS transmitter 100 are mounted in the wheel rim hole 310 together. It can be seen from FIG. 2D that the elastomer end section 213 and the supporting part 214 of the valve stem are embedded in the wheel rim hole 310, and the bottom of the TPMS transmitter 100 contacts the wheel rim surface 320.

The beneficial effect of this embodiment is that when the TPMS transmitter 100 is lifted away from the wheel rim surface 320 in the driving of automobile, the supporting part 214 of the valve stem will not be lifted away from the wheel rim surface 320 and still play a supporting role, which prevents the TPMS transmitter 100 from rotating around the axial direction of the core rod 200; because this embodiment adds the supporting part 214 to the elastomer end section 213 of the conventional valve stem, the mounting method is basically the same as that of the conventional buckled valve stem, which can be pulled in or pushed in for direct replacement with the conventional valve stem; due to the addition of the supporting part 214, the mounting direction of the TPMS transmitter 100 is limited, which can ensure that the TPMS transmitter 100 will not be biased when it is mounted on the wheel rim 300, and can effectively reduce the risk of loss of function or reduction in performance of the TPMS transmitter 100 due to the biased or backward mounting of the TPMS transmitter 100.

Embodiment 2

Figure 3A:
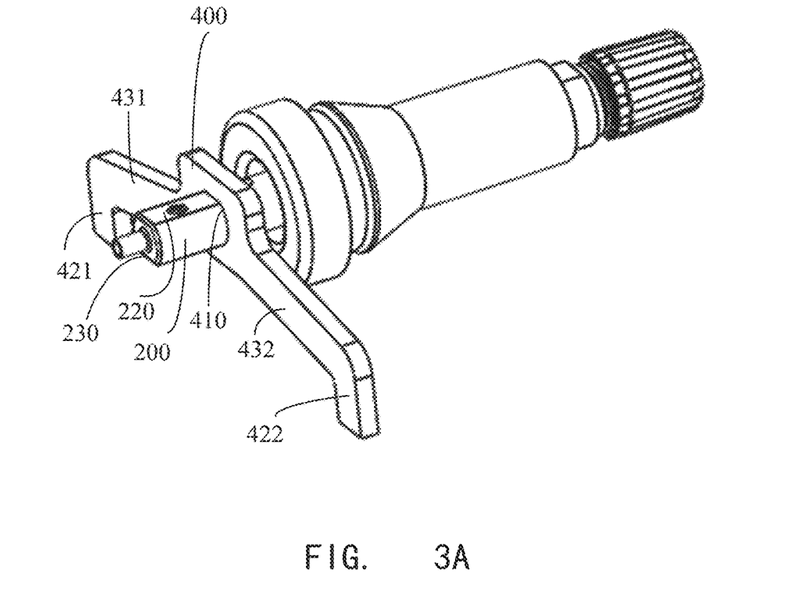
FIG. 3A is a schematic diagram of the second embodiment of the present invention, the protruding part of the valve stem is a supporting member sheathed on the end section of the core rod of the valve stem.

FIG. 3A shows another embodiment of the present invention. In this embodiment, a supporting member 400 is sheathed at the end of the core rod 200 near the mounting position of the TPMS transmitter 100. The middle part of the supporting member 400 is provided with a hole 410 matched with the shape of the end of the core rod 200. For example, the end of the core rod 200 is made into a flat square structure, which has two opposite planes, the upper surface 220 and the lower surface 230 from the perspective of the figure. The shape of the hole 410 in the middle of the supporting member 400 matches the flat square structure at the end of the core rod 200, so that the end of the core rod 200 can just pass through the hole 410 in the middle of the supporting member 400 and engage with it. It can be understood that the embodiment of the invention does not limit the end of the core rod 200 to be a flat square structure, as long as the matching shape of the end of the core rod and the supporting member can prevent the two from relative rotation. The supporting member 400 includes two supporting feet 421 and 422, which are connected with the middle part of the supporting member 400 through the supporting rods 431 and 432 respectively, and the angle between the supporting feet 421, 422 and the supporting rods 431, 432 is greater than or equal to 90 degrees. The supporting feet 421, 422, the supporting rods 431, 432 and the middle part of the supporting member 400 are integrally formed or fixedly connected. The material of the supporting member 400 in this embodiment can be rigid, such as metal or plastic.

Figure 3B:
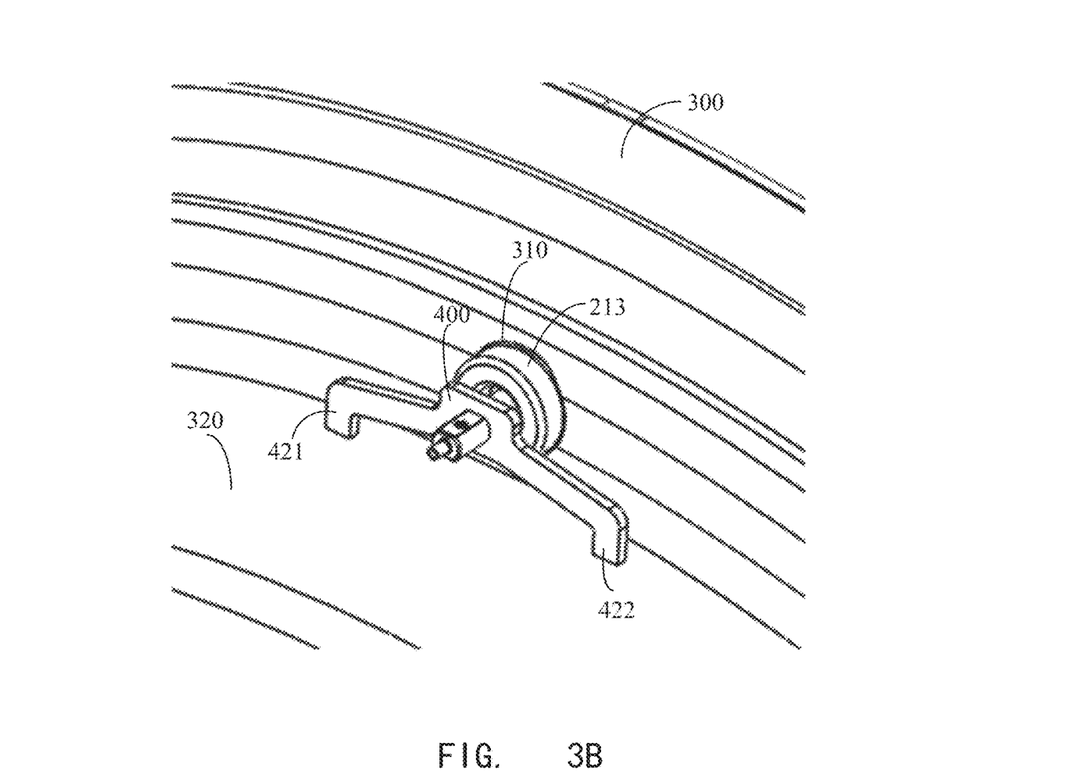
FIG. 3B is a schematic diagram of the second embodiment of the present invention when it is mounted on the wheel rim hole.
Figure 3C:
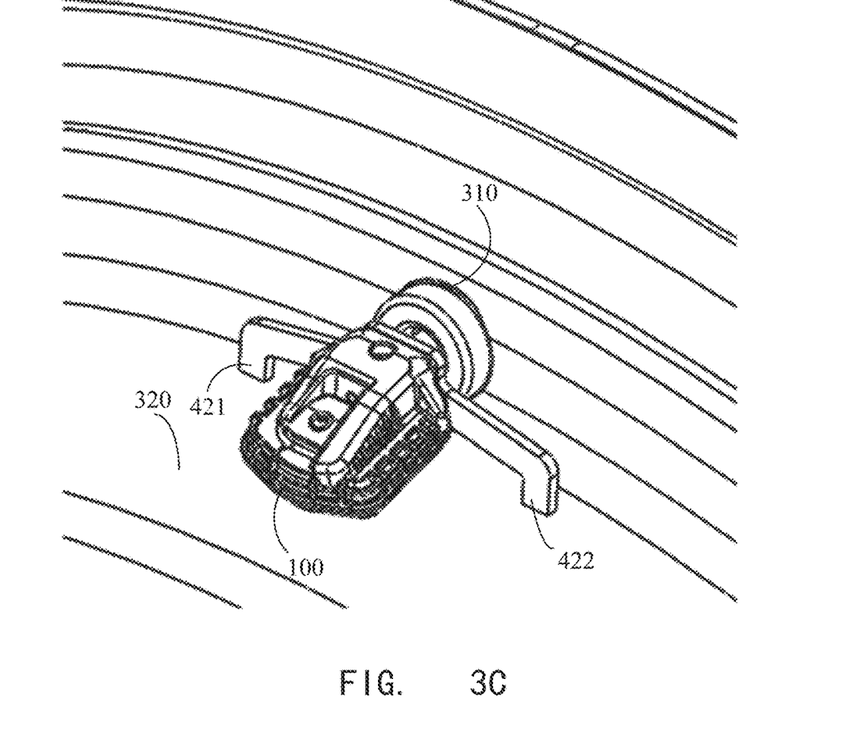
FIG. 3C is a schematic diagram when the second embodiment of the present invention and the TPMS transmitter are mounted on the wheel rim hole together.

As shown in FIG. 3B, when the valve stem is mounted in the wheel rim hole 310, the supporting feet 421 and 422 of the supporting member 400 contact the wheel rim surface 320 of the wheel rim 300 to support. FIG. 3C is a schematic diagram when the valve stem of this embodiment and TPMS transmitter 100 are mounted on the wheel rim hole 310 together. As shown in FIG. 3C, the supporting function of the supporting feet 421 and 422 can prevent the TPMS transmitter 100 fixed to it from rotating relative to the axis of the valve stem even if it is lifted away from the wheel rim surface 320.

The beneficial effect of this embodiment is that the structure of the valve stem itself does not need to be changed, but only an accessory is added to the original structure, which is easy to mount; the distance between the two supporting feet 421 and 422 of the supporting member 400 is greater than the gap G between the supporting part 214 and the wheel rim surface 320 in the first embodiment, and the distance between the supporting feet not only serves a buffering function in the driving of the automobile, but also has stronger stability.

Embodiment 3

Figure 4A:
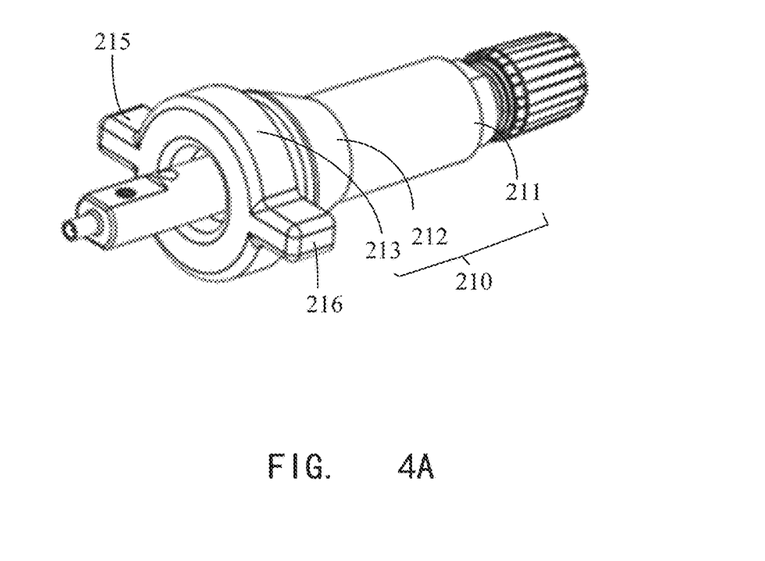
FIG. 4A is a schematic diagram of the third embodiment of the present invention, the protruding part of the valve stem are two protruding parts arranged in the axial symmetrical position of the elastomer end section of the valve stem.

As shown in FIG. 4A, this embodiment is similar to the first embodiment in that the elastomer end section 213 of the valve stem is changed. In this embodiment, at least one protruding part is added on the elastomer end section 213 of the valve stem. The protruding part is located at a position suitable for contacting with a sidewall of the wheel rim in the axial direction of the valve stem. Meanwhile, the sidewall of the wheel rim is provided with a concave part matched with the protruding part.

Figure 4B:
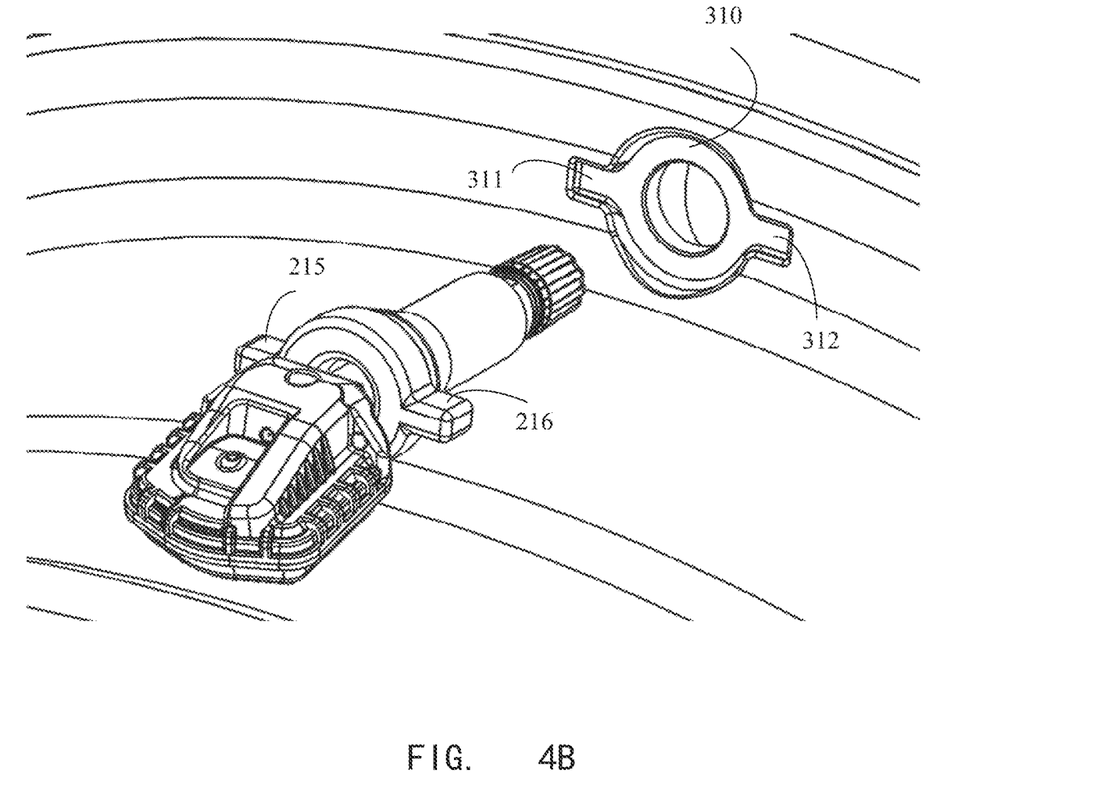
FIG. 4B is a schematic diagram of the concave part on the sidewall of the wheel rim which is matched with the protruding part of the valve stem in the third embodiment of the present invention.

Preferably, in this embodiment, there are two protruding parts 215 and 216. The exemplary structure of the two protruding parts 215 and 216 can be a cube shape, which is integrally formed or fixedly connected with the elastomer end section 213 of the valve stem. It can be understood that the above-mentioned shape is only an example, and the protruding parts 215 and 216 may also be other shapes. The material of the protruding parts can be consistent with the elastomer, so as to facilitate one-time forming or fixed connection, and it can also be other elastic materials. The positions of two examples of the protruding parts are shown in FIG. 4A, and their connecting line is parallel to the wheel rim surface. The two protruding parts 215 and 216 are symmetrically distributed on the outer circumference of the elastomer end section 213 of the valve stem. Correspondingly, as shown in FIG. 4B, the wheel rim hole 310 of the wheel rim is provided with concave parts 311 and 312 matched with the protruding part, and the size and position of the concave parts are adapted to the protruding parts 215 and 216, so that the elastomer end section 213 with the protruding part can be inserted into the wheel rim hole 310 with the concave part.

In other embodiments, there may be two or more protruding parts uniformly or non-uniformly distributed on the outer circumference of the elastomer end section 213 of the valve stem. Correspondingly, the wheel rim hole 310 of the wheel rim is also provided with concave part matched with the number, size and position of the protruding part.

Figure 4C:
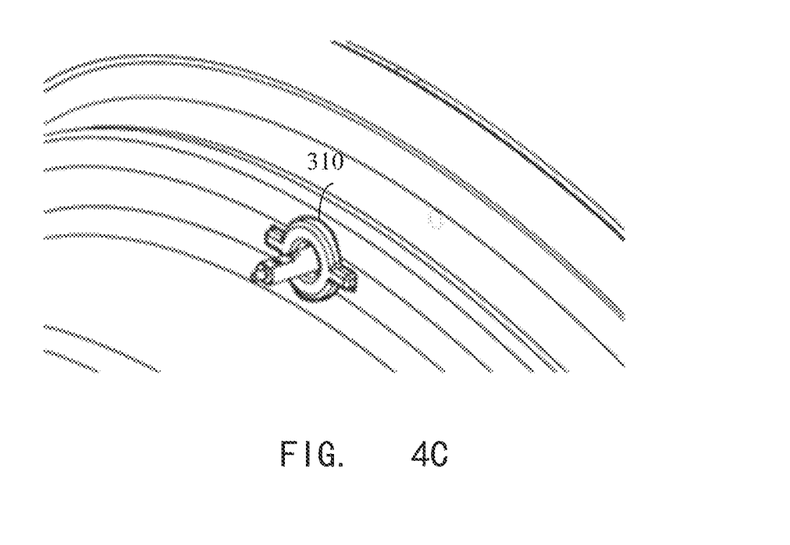
FIG. 4C is a schematic diagram of the third embodiment of the present invention when it is mounted on the wheel rim hole.

FIG. 4C is a schematic diagram when the embodiment is mounted on the wheel rim hole 310. The valve stem just fits on the wheel rim hole 310 to prevent the valve stem from rotating.

Figure 4D:
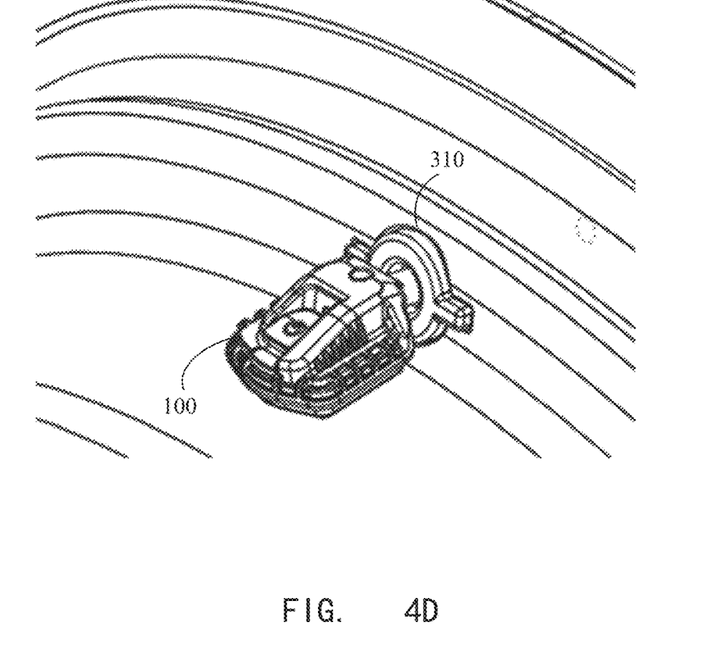
FIG. 4D is a schematic diagram when the third embodiment of the present invention and the TPMS transmitter are mounted on the wheel rim hole together.

FIG. 4D is a schematic diagram when the embodiment and TPMS transmitter 100 are mounted on the wheel rim hole 310 together.

The beneficial effect of the present embodiment is similar to that of the first embodiment.

Embodiment 4

Figure 5A:
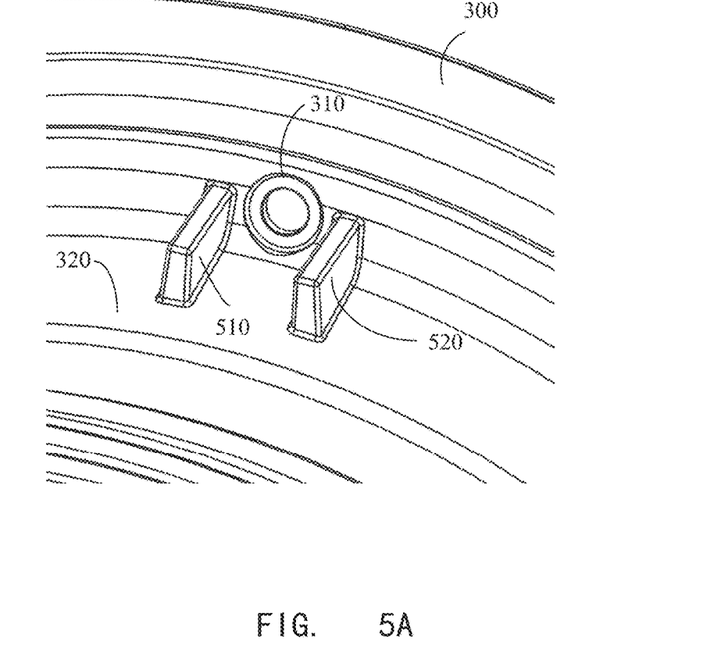
FIG. 5A is a schematic diagram of the fourth embodiment of the present invention.
Figure 5B:
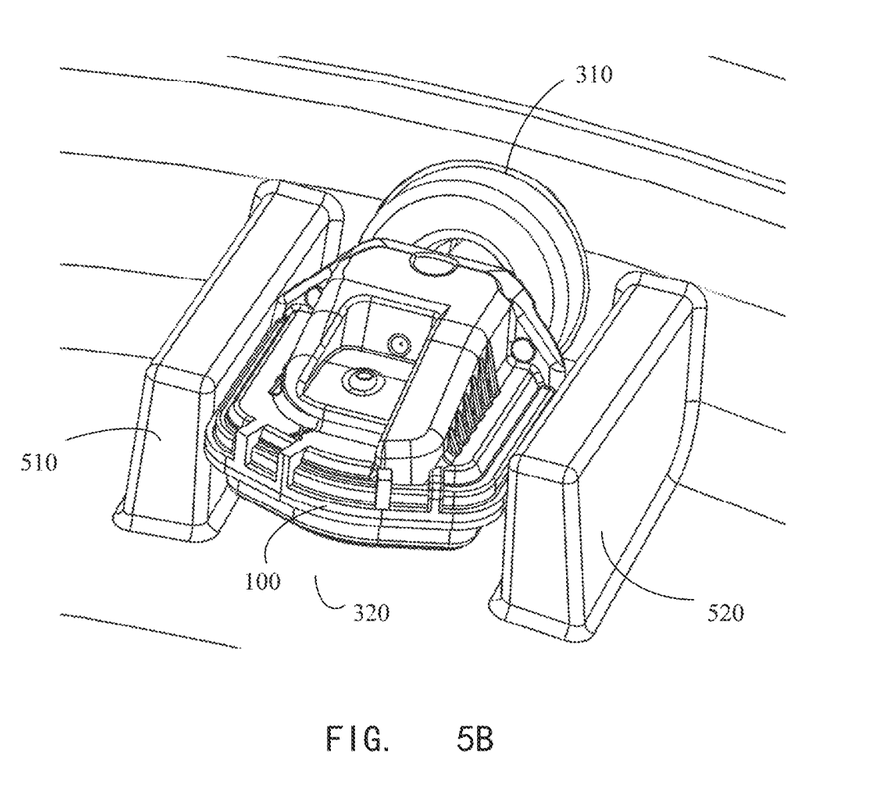
FIG. 5B is a schematic diagram of the fourth embodiment of the present invention and the TPMS transmitter are mounted on the wheel rim hole together.

As shown in FIG. 5A, in this embodiment, two protruding parts 510 and 520 are arranged on the wheel rim surface 320. The protruding part is rectangular and is fixed along the radial direction of wheel rim 300. The bottom of the protruding part is in contact with the wheel rim surface 320, and the contact part between the protruding part and the side surface where the wheel rim hole 310 is located has an arc fitting with the part. The two protruding parts are respectively located on both sides of the wheel rim hole 310, and their spacing is adapted to the size of the TPMS transmitter 100, so that the two protruding parts 510 and 520 can contact with the TPMS transmitter 100 to hold it, as shown in FIG. 5B. When the automobile is driving, the two protruding parts 510 and 520 can counteract the rotational torque produced by the eccentricity and centrifugal force of the transmitter 100, so as to ensure that the TPMS transmitter 100 in operation does not rotate and operates stably. The height of the protruding part should ensure that when the TPMS transmitter 100 is lifted away from the wheel rim surface 320, it will not exceed the two protruding parts. In this embodiment, the material of the protruding part can be elastic material, such as rubber, or rigid material, such as metal.

Embodiment 5

Figure 6A:
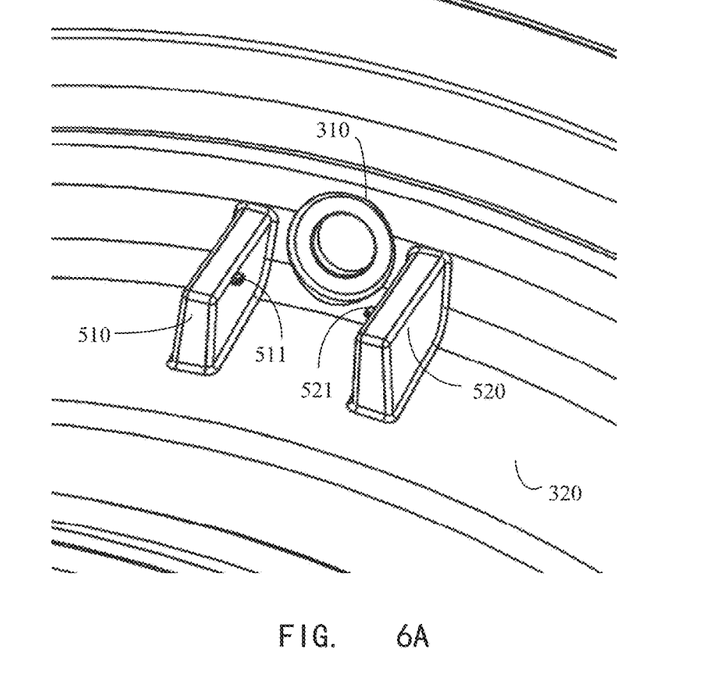
FIG. 6A is a schematic diagram of the fifth embodiment of the present invention.
Figure 6B:
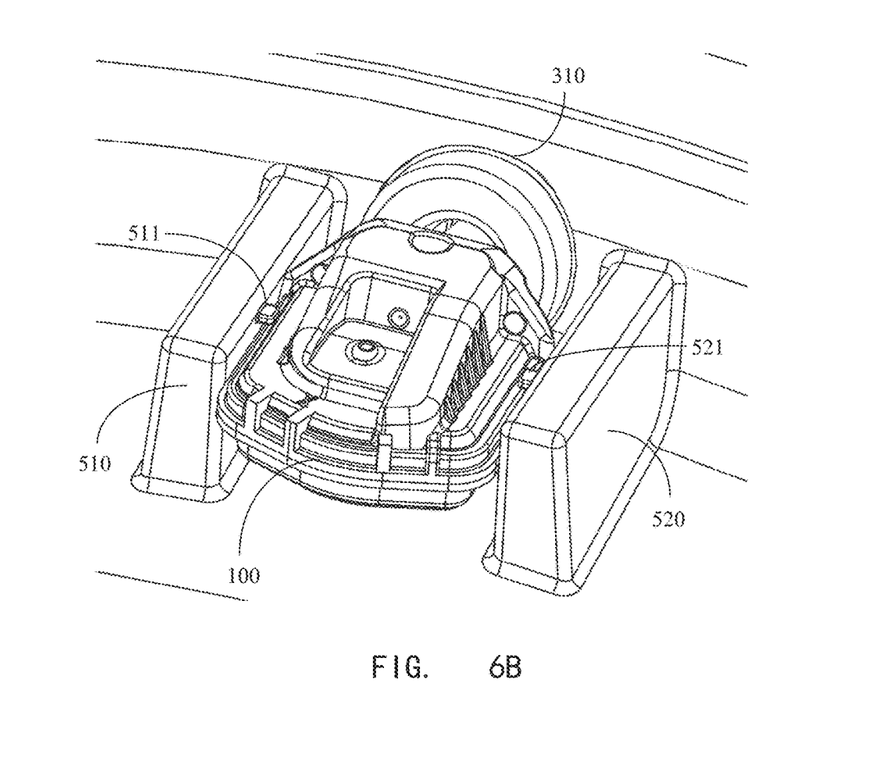
FIG. 6B is a schematic diagram of the fifth embodiment of the present invention and the TPMS transmitter are mounted on the wheel rim hole together.

As shown in FIG. 6A, in this embodiment, on the basis of the fourth embodiment, two protruding parts 510 and 520 set on the wheel rim surface 320 are added with one stop block 511 and 521 respectively. The stop blocks 511 and 521 are respectively located on the side surfaces of the protruding parts 510 and 520 facing the wheel rim hole 310, and their positions are in the middle or high part of the side. As shown in FIG. 6B, when the TPMS transmitter 100 is mounted in the wheel rim hole 310, the stop blocks 511 and 521 just stuck on both sides of the TPMS transmitter 100. The position and shape of the stop blocks 511 and 521 are set to limit the lifting height of the TPMS transmitter 100 when it is lifted off the wheel rim due to eccentricity and centrifugal force when the automobile is driving. Preferably, the structure of the stop blocks 511 and 521 and the setting of their positions prevent the TPMS transmitter 100 from being lifted away from the wheel rim during the driving of the automobile, so that the position will not shift. As shown in FIG. 6A, the exemplary structures of the stop blocks 511 and 521 may be cube shaped, and in other embodiments, they may also be other shapes.

Embodiment 6

Figure 7A:
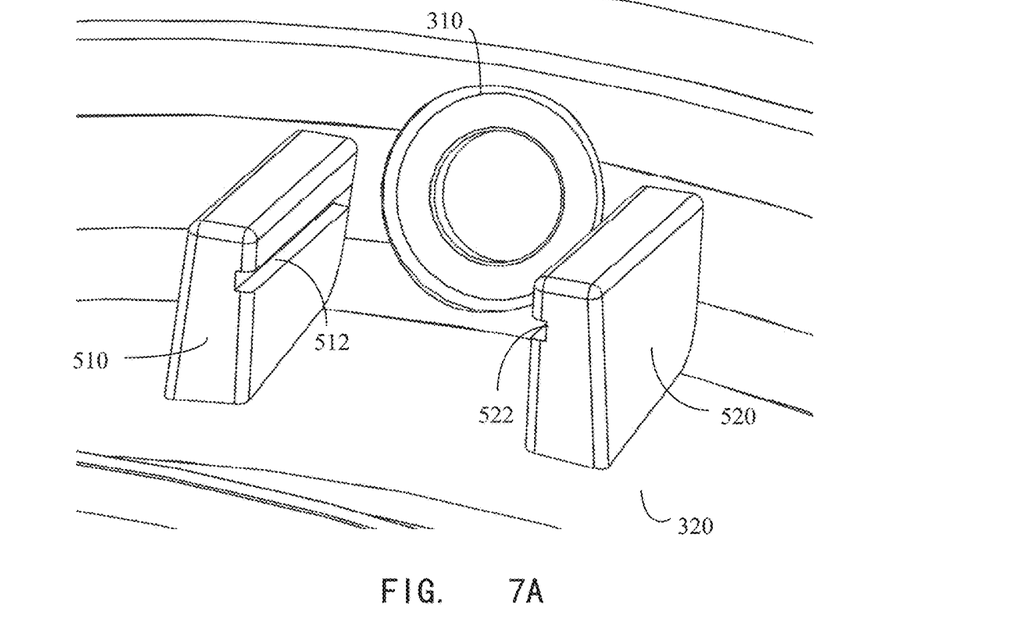
FIG. 7A is a schematic diagram of the sixth embodiment of the present invention.
Figure 7B:
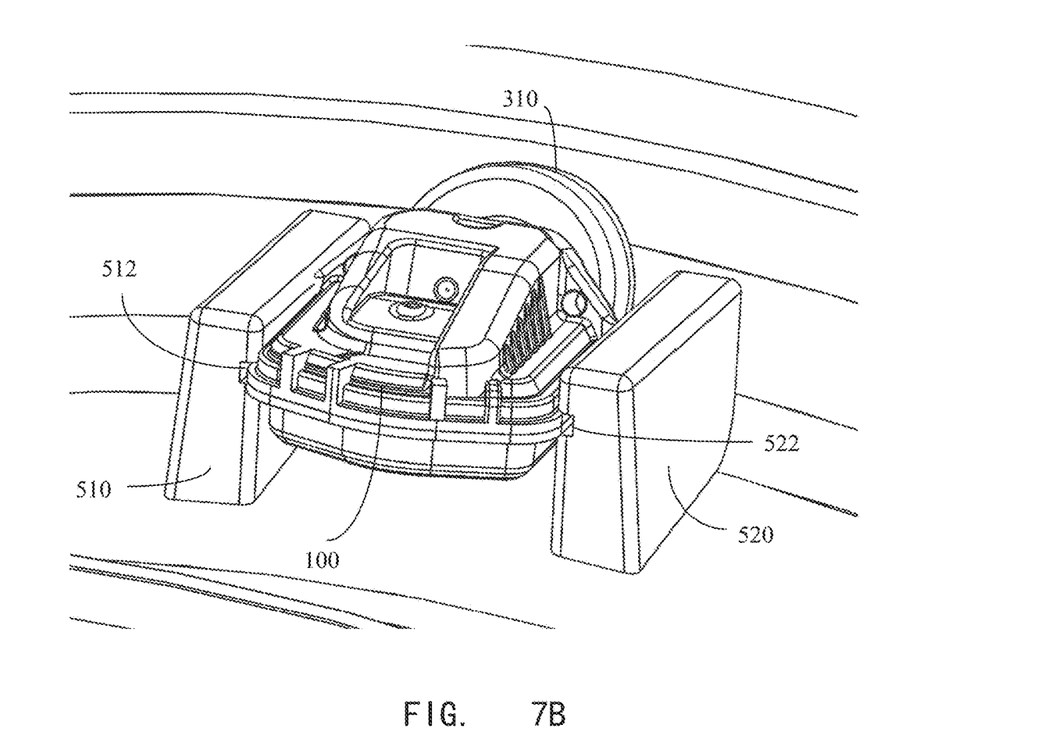
FIG. 7B is a schematic diagram of the sixth embodiment of the present invention and the TPMS transmitter are mounted on the wheel rim hole together.

As shown in FIG. 7A, in this embodiment, on the basis of the fourth embodiment, two grooves 512 and 522 are respectively added on the two protruding parts 510 and 520 set on the wheel rim surface 320. The grooves 512 and 522 are respectively located on the side surfaces of the protruding parts 510 and 520 facing the wheel rim hole 310, and their positions are at the middle and high parts of the side. As shown in FIG. 7B, when the TPMS transmitter 100 is mounted in the wheel rim hole 310, the most protruding parts on both sides of the body of the TPMS transmitter 100 can be inserted into the grooves 512 and 522. The positions, depths and widths of the grooves 512 and 522 are set to limit the lifting height of the TPMS transmitter 100 when it is lifted off the wheel rim due to eccentricity and centrifugal force. Preferably, the positions, widths and depths of the grooves 512 and 522 are set so that the TPMS transmitter 100 will not be lifted away from the wheel rim during the driving of the automobile, so that the position will not shift. As shown in FIG. 7A, the exemplary structures of the grooves 512 and 522 may be rectangular grooves, or other shapes in other embodiments.

Embodiments 4, 5 and 6 have the advantages of simple structure, convenient processing and low cost.

In the above embodiments of the present invention, the material of the elastomer is usually rubber.

Figure 8A:
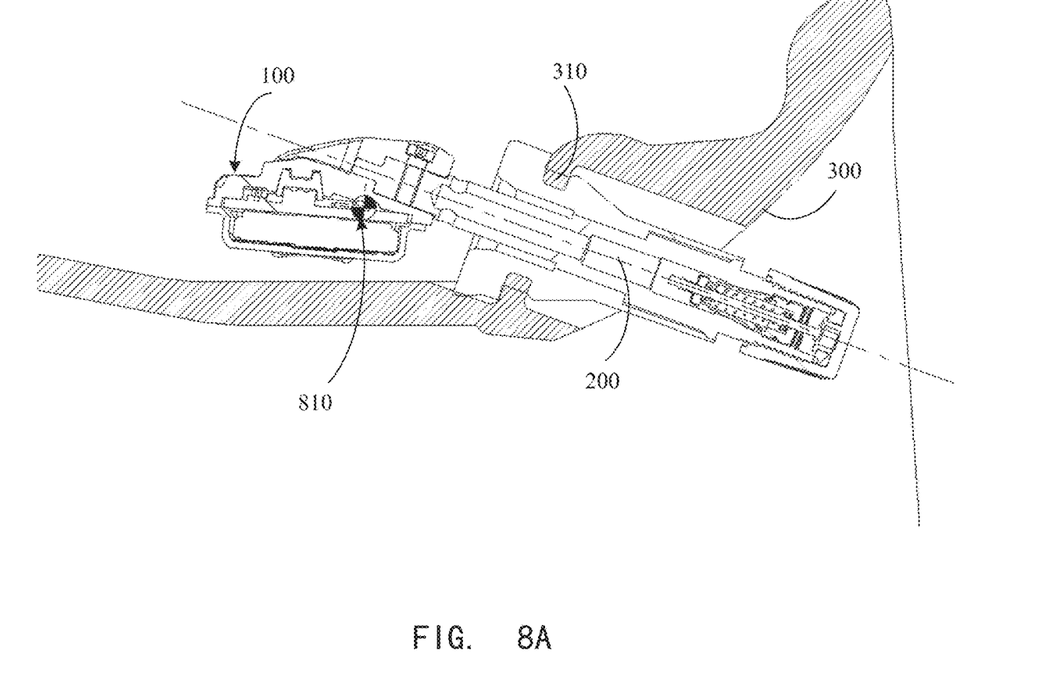
FIGS. 8A and 8B are structural diagrams of the TPMS transmitter assembling structure according to an embodiment of the present invention.
Figure 8B:
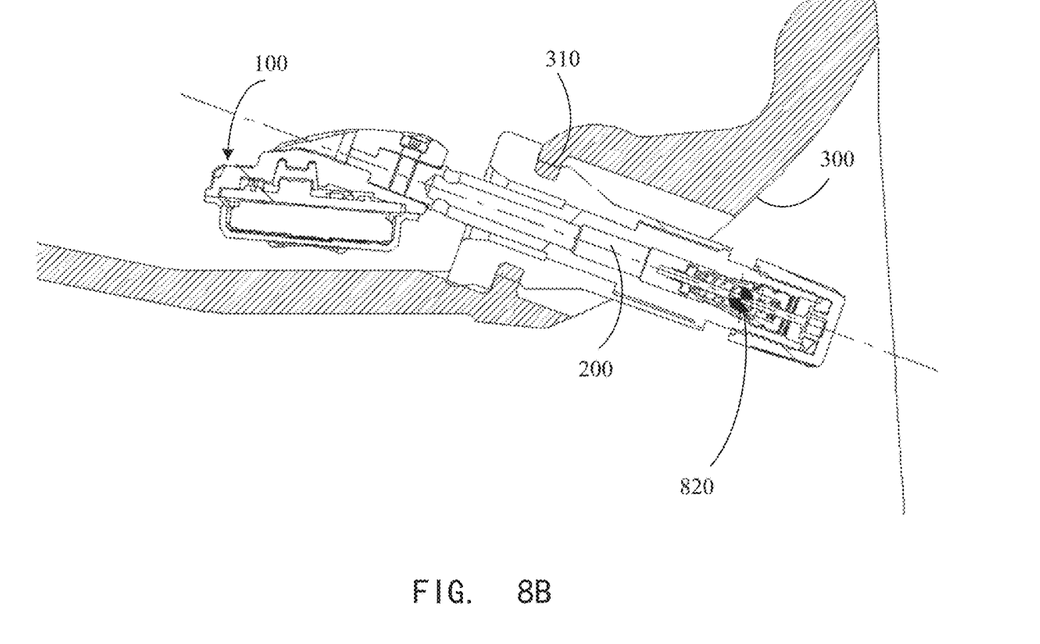

FIGS. 8A and 8B are structural diagrams of the assembling structure of the TPMS transmitter according to an embodiment of the present invention. Referring to FIGS. 8A and 8B, the assembling structure includes the fixing structure in the above embodiments. The fixing structure includes a valve stem and, for example, a supporting part 214 in the first embodiment, a supporting part 400 in the second embodiment, the protruding parts 215 and 216 integrally formed or fixedly connected with the elastomer end section 213 of the valve stem in the third embodiment, the concave parts 311 and 312 on the wheel rim hole 310, the two protruding parts 510 and 520 on the wheel rim surface 320 in the fourth embodiment, etc. Combining with FIG. 2D, the fixing structure shown in FIGS. 8A and 8B is similar to the supporting part 214 as the fixing structure in the first embodiment. However, FIGS. 8A and 8B are only examples and are not used to limit the structure of the fixing structure included in the assembling structure of the present invention.

Referring to FIGS. 8A and 8B, the assembling structure further includes a transmitter 100, which is assembled with the fixing structure. The fixing structure of TPMS transmitter is located on the inner side of wheel rim 300, that is, the side where the transmitter 100 is located. The core rod 200 of the valve stem passes through the wheel rim hole 310 and extends out of the wheel rim 300, so a part of the core rod 200 is located on the outside of the wheel rim 300, that is, the side opposite to the side where the transmitter 100 is located.

FIG. 8A is used to show the overall assembling state of the TPMS transmitter when the assembling structure of the present invention is not adopted. As shown in FIG. 8A, in this example, the overall center of gravity position 810 of the transmitter 100 and the fixing structure is located on the inner side of the wheel rim 300. During the operation of the automobile, the wheel rim rotates, and the centrifugal force on the transmitter and the fixing structure causes the center of gravity move away from the center of the wheel rim. Since the overall center of gravity position 810 of the transmitter 100 and the fixing structure is located on the inner side of the wheel rim 300, when the overall center of gravity position 810 moves away from the center of the wheel rim, the transmitter 100 and the fixing structure on the inner side of the wheel rim 300 may move up and away from the wheel rim surface, resulting in the fixing structure of the TPMS transmitter losing the fixed effect on the TPMS transmitter. For example, for the first embodiment, the supporting part 214 may move upward away from the wheel rim surface 320; for the second embodiment, the supporting feet 421 and 422 may move upward away from the wheel rim surface 320. When the fixing structure of TPMS transmitter cannot play a fixed role, the transmitter 100 may rotate or move, thus affecting its performance.

FIG. 8B is used to show the overall assembling state of the TPMS transmitter when adopting the assembling structure of the present invention. As shown in FIG. 8B, according to the assembling structure of the present invention, when the transmitter 100 and the fixing structure are assembled together, the overall center of gravity position 820 of the transmitter 100 and the fixing structure is located at a part of the valve stem outside the wheel rim 300. During the operation of the automobile, the wheel rim rotates, and the centrifugal force on the transmitter 100 and the fixing structure causes the center of gravity move away from the center of the wheel rim. Since the overall center of gravity position 820 of transmitter 100 and fixing structure is located on the outside of wheel rim 300, when the center of gravity moves outward, the part of the valve stem outside the wheel rim 300 will move upward under centrifugal force, accordingly, the transmitter 100 inside the wheel rim 300 will move downward, so as to be more close to the wheel rim surface, thus strengthening the supporting and fixing function of the fixing structure.

In this embodiment, when designing the fixing structure, the overall center of gravity position 820 of the transmitter 100 and the fixing structure can be located at a part of the valve stem located outside the wheel rim 300 through selection of its structure and material. For example, the end of the core rod 200 of the valve stem is usually made of metal material, so for the first and second embodiments, lighter materials can be used for the supporting part 214 and the supporting feet 421 and 422. For the third to sixth embodiments, although the fixing structure itself can play a good role of fixing the transmitter 100, the embodiment shown in FIG. 8B can also be applied to these embodiments to further avoid the transmitter lifting off the wheel rim surface.

Unless it is clearly stated in the claim, the sequence of processing elements and sequences, the use of numbers and letters, or the use of other names in the application are not used to limit the sequence of the application process and method. Although some embodiments of the invention that are currently considered useful are discussed through various examples in the above disclosure, it should be understood that such details are only for the purpose of illustration, and the additional claims are not limited to the disclosed embodiments. On the contrary, the claims are intended to cover all modifications and equivalent combinations that conform to the essence and scope of the embodiments of the present application.

The present application uses specific words to describe the embodiments of the present application. For example, "an embodiment", "one embodiment", and/or "some embodiments" mean a certain feature, structure or feature related to at least one embodiment of the present application. Therefore, it should be emphasized and noted that "an embodiment" or "one embodiment" or "an alternative embodiment" mentioned twice or more in different positions in this specification do not necessarily refer to the same embodiment. In addition, some features, structures or features in one or more embodiments of the present application may be appropriately combined.

Similarly, it should be noted that in order to simplify the disclosure of this application and help understand one or more application embodiments, in the previous description of the application embodiments, multiple features are sometimes incorporated into one embodiment, drawings or the description thereof. However, this disclosure method does not mean that the application object needs more features than those mentioned in the claims. In fact, the features of the embodiment are less than all the features of the single embodiment disclosed above.

Although the invention has been described with reference to the current specific embodiments, ordinary technicians in the technical field should realize that the above embodiments are only used to describe the invention, and various equivalent changes or substitutions can be made without departing from the spirit of the invention. Therefore, as long as the changes and variations of the above embodiments are within the scope of the essence of the present invention, they will fall within the scope of the claims of this application.

The invention claimed is:

1. A TPMS transmitter fixing structure, comprising a valve stem, the valve stem including a core rod, the core rod having a connector suitable for connecting to a TPMS transmitter, wherein the valve stem also includes a protruding part protruding outward along the radial direction of the valve stem, wherein when the valve stem is mounted on a wheel rim, the protruding part is in contact with the wheel rim, wherein the protruding part comprises a supporting part suitable for supporting on a wheel rim surface of the wheel rim, and a middle part of a contact surface between the supporting part and the wheel rim surface has a depression radially inward along the valve stem;

wherein when the core rod is inserted into a wheel rim hole, the core rod is covered with an elastomer and the elastomer includes an elastomer end section, and the elastomer end section and the supporting part are both located on the wheel rim surface in the wheel rim;

wherein a center of gravity of the fixing structure and the TPMS transmitter as a whole is arranged at a part of the valve stem located outside the wheel rim.

2. The TPMS transmitter fixing structure according to claim 1, wherein the protruding part is in contact with the wheel rim such that a radial outer contour of the valve stem is a non-rotating curved surface that prevents rotation of the valve stem, and prevents the TPMS transmitter from rotating with the valve stem.

3. The TPMS transmitter fixing structure according to claim 1, wherein the protruding part is formed on an elastomer covering the core rod.

4. The TPMS transmitter fixing structure according to claim 1, wherein the protruding part further comprises a supporting member fixed on the end of the core rod and suitable for supporting on a wheel rim surface of the wheel rim.

5. The TPMS transmitter fixing structure according to claim 4, wherein the supporting member comprises at least two supporting feet.

6. The TPMS transmitter fixing structure according to claim 4, wherein the supporting member is composed of metal or plastic.

7. The TPMS transmitter fixing structure according to claim 1, wherein the protruding part is located at a position suitable for contacting with a sidewall of the wheel rim in an axial direction of the valve stem, wherein the sidewall of the wheel rim has a concave part matched with the protruding part.

8. A TPMS transmitter assembling structure, comprising:
the fixing structure according to claim 1; and
a transmitter, which is assembled with the fixing structure, wherein a center of gravity of the fixing structure and the transmitter as a whole is arranged at a part of the valve stem located outside the wheel rim.

* * * * *